United States Patent
Marshall et al.

(10) Patent No.: US 7,190,979 B1
(45) Date of Patent: Mar. 13, 2007

(54) BATTERY ECONOMIZING IN A COMMUNICATIONS SYSTEM

(75) Inventors: Paul R. Marshall, Red Hill (GB); David K. Roberts, Horley (GB); Richard C. Burbidge, Hook (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 574 days.

(21) Appl. No.: 09/653,782

(22) Filed: Sep. 1, 2000

(30) Foreign Application Priority Data

Sep. 2, 1999 (GB) .................................. 9920615.3

(51) Int. Cl.
*H04B 1/38* (2006.01)

(52) U.S. Cl. ............... 455/574; 455/573; 455/343.4; 455/343.5; 375/346; 375/326

(58) Field of Classification Search .......... 455/574, 455/343, 421, 132–134, 226.1–226.4, 575, 455/550, 127, 343.1–343.6, 423, 572, 135.1, 455/2, 561, 456.5–456.6, 575.1, 550.1, 67.11, 455/127.1, 277.2, 115.3–115.4, 21, 573; 379/93.2, 379/58–61, 22, 24, 27; 340/825.44, 825.47, 340/825.48, 311.1, 825.49, 825.36; 370/311, 370/322; 375/346, 326, 222
See application file for complete search history.

(56) References Cited

U.S. PATENT DOCUMENTS

| | | | | |
|---|---|---|---|---|
| 3,906,150 A | * | 9/1975 | Ivas | |
| 4,506,386 A | * | 3/1985 | Ichikawa et al. | 455/343 |
| 4,977,611 A | * | 12/1990 | Maru | 455/161.2 |
| 5,144,296 A | * | 9/1992 | DeLuca et al. | 340/7.35 |
| 5,369,798 A | * | 11/1994 | Lee | 455/434 |
| 5,566,364 A | * | 10/1996 | Mizoguchi et al. | 455/132 |
| 6,058,289 A | * | 5/2000 | Gardner et al. | 340/7.32 |
| 6,216,540 B1 | * | 4/2001 | Nelson et al. | 73/633 |
| 6,219,540 B1 | * | 4/2001 | Besharat et al. | 455/421 |
| 6,263,200 B1 | * | 7/2001 | Fujimoto | 455/343 |

FOREIGN PATENT DOCUMENTS

| | | |
|---|---|---|
| EP | 0554941 B1 | 8/1993 |
| WO | WO9925051 | 5/1999 |

* cited by examiner

*Primary Examiner*—Edward F. Urban
*Assistant Examiner*—Charles Chow
(74) *Attorney, Agent, or Firm*—Larry Liberchuk

(57) ABSTRACT

In communications systems such as telemetry systems in which a receiver (34) is periodically energised to receive transmissions from a central station, the receiver includes a power control means (12) for controlling the energisation of the receiver, a circuit (48) for detecting the presence of a carrier, which circuit (48) causes the power control means to de-energise the receiver (34) in the event of carrier not being detected, and a signal quality measuring stage (50) for determining if the demodulated signal is decodable, the stage (50) causing the power control means to de-energise the receiver (34) in the event of the signal quality not being acceptable.

3 Claims, 4 Drawing Sheets

Figure 1:
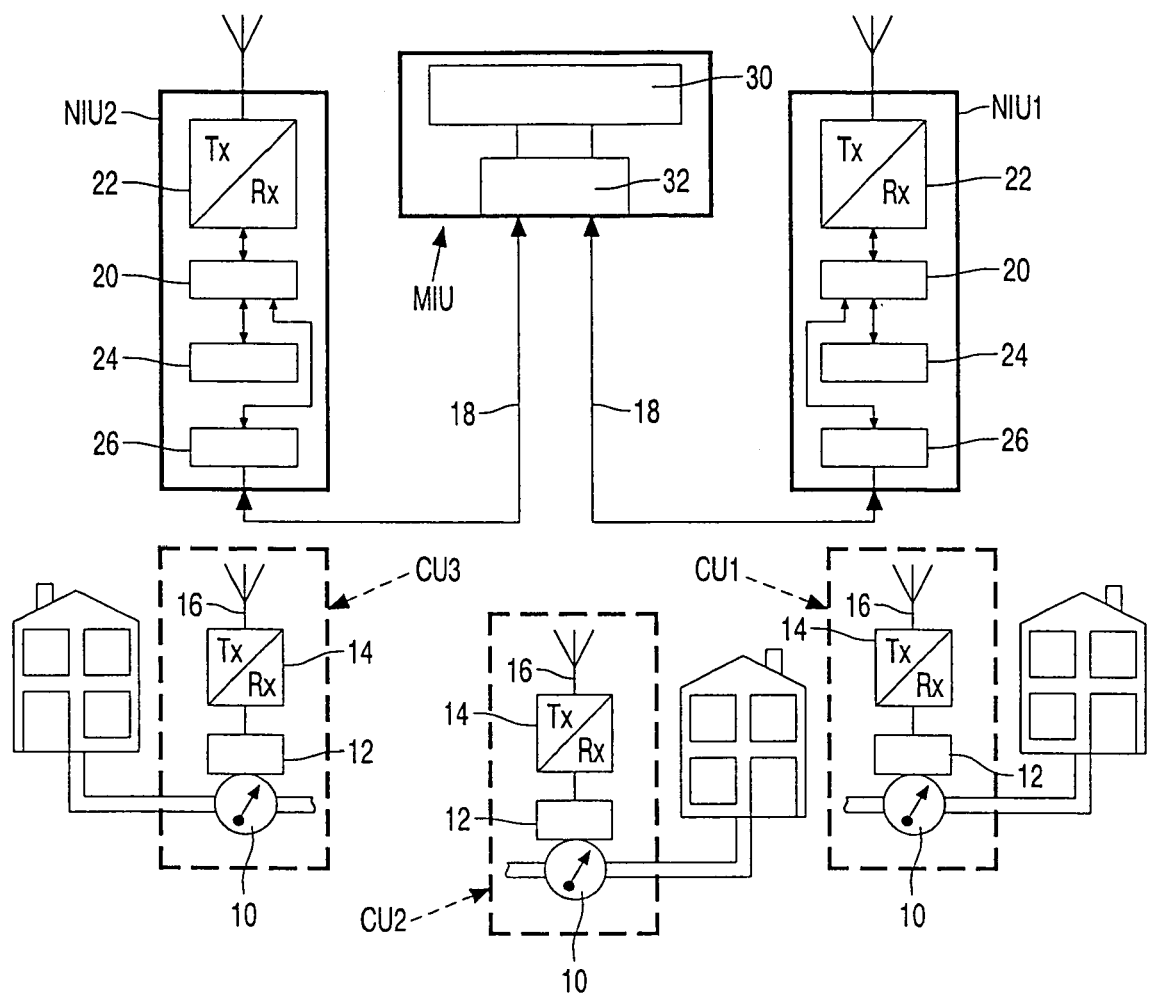

| | CDT (ms) | CDFR | SQT (ms) | SQFR | TFR | AROT (ms) |
|---|---|---|---|---|---|---|
| SSCD 80 | 20 | 0.01 | n/a | n/a | 0.01 | 20 + (0.01 x 50) = 20.5 |
| SSCD 82 | 10 | 0.1 | n/a | n/a | 0.1 | 10 + (0.1 x 50) = 15 |
| SSCD 84 | 5 | 0.25 | n/a | n/a | 0.25 | 5 + (0.25 x 50) = 17.5 |
| TSCD 86 | 10 | 0.1 | 20 | 0.01 | 0.001 | 10 + (0.1 x 20) + (0.001 x 50) = 12.0 |

|       | CDT (ms) | CDFR | SQT (ms) | SQFR | TFR   | AROT (ms)                              |
|-------|----------|------|----------|------|-------|----------------------------------------|
| SSCD 80 | 20       | 0.01 | n/a      | n/a  | 0.01  | 20 + (0.01 x 50) = 20.5                |
| SSCD 82 | 10       | 0.1  | n/a      | n/a  | 0.1   | 10 + (0.1 x 50) = 15                   |
| SSCD 84 | 5        | 0.25 | n/a      | n/a  | 0.25  | 5 + (0.25 x 50) = 17.5                 |
| TSCD 86 | 10       | 0.1  | 20       | 0.01 | 0.001 | 10 + (0.1 x 20) + (0.001 x 50) = 12.0  |

FIG. 4

BATTERY ECONOMIZING IN A COMMUNICATIONS SYSTEM

The present invention relates to a method of battery economising in a communications system, to a communications system and to a receiving station for use in the system. The communications system may comprise a telecommunications system such as a paging or cordless/cellular telephone system or telemetry system for example an automatic meter reading system.

In many telecommunications and telemetry applications, equipments are on standby for extended periods of times for example months if not years. Consequently for battery powered equipments, any means of extending the useful life of a battery power source is of importance. For radio equipments the receiver is often the dominant source of power consumption within the equipment.

Power saving in receivers of radio equipments has been practised for a relatively long time in for example the digital paging field. The POCSAG Paging Standard or CCIR Radiopaging Code No. 1 has an inherent power saving capability because under the protocol time is divided into successive time periods called batches. A batch comprises a sync code word and 8 frames. A receiver is powered for receipt of a sync code word and for a predesignated one of eight frames in successive batches, any messages for the receiver being transmitted in the predesignated frame. During the time periods between the sync code word and the predesignated frame and vice versa, the receiver can be powdered down.

EP-B1-0 554 941 discloses the option of a paging system controller transmitting address or receiver identity codes (RICs) in an order of increasing or decreasing numerical significance and if a pager which has been powdered-up for its predesignated frame notes from the first few bits of an address being received that it follows after its own address in the ordered sequence and therefore there is not a call or message for itself, the receiver section of the pager is powdered down before the end of the frame in order to save power.

WO99/25051 discloses a method of, and communications system for, battery economising in a telemetry system having remotely located terminal units, each unit including a radio receiver having a radio identity code consisting of M bits and a transmitter. A base station transmits a wake-up message consisting at least two repetitions of a wake-up sequence, the wake-up sequence comprising N concatenated parts, where N is an integer. Each of the N parts includes a sync code word and a different fraction M/N of bits of a radio identity code. The radio receiver in each terminal unit is energised intermittently in order to detect carrier and at least one of the N parts. In response to detecting the at least one of the N parts, the radio receiver remains energised and analyses at least the detected one of the N parts. If the received bits of the radio identity code do not correspond to the corresponding bits of the radio receiver's radio identity code, the radio receiver reverts to an intermittent energisation. If the complete radio identity code is detected the receiver remains energised to receive a message appended to the transmitted radio identity code.

Whilst all these known techniques enhance battery economising, there is a continuing desire to reduce demands for power by the radio receiver in order to extend the life of a battery thereby ensuring longer useful operating lives of the terminal units and ensure a prompt response can be given when required.

An object of the invention is to facilitate power saving in communications apparatus.

According to one aspect of the present invention there is provided a method of operating a receiver, comprising energising the receiver, detecting the presence of a carrier signal, de-energising the receiver if the carrier signal is not detected, maintaining energisation of the receiver if the carrier signal is detected, detecting if the received signal is decodable, de-energising the receiver if the signal is not decodable and if it is decodable, decoding the signal.

According to a second aspect of the present invention there is provided a communications system comprising a primary station having a transmitter for transmitting a signal and at least one secondary station having a receiver for receiving signals from the primary station, the receiver comprising signal receiving means, means for detecting the presence of a received signal, means for detecting the quality of the received signal and power control means for de-energising the receiver if the presence of a signal is not detected or the quality of the signal is unacceptable.

According to a third aspect of the present invention there is provided a receiver comprising signal receiving means, means for detecting the presence of a received signal, means for detecting the quality of the received signal and power control means for de-energising the receiver if the presence of a signal is not detected or the quality of the signal is unacceptable.

In an embodiment of the method in accordance with the present invention, each time a receiver is powdered-up it uses a radio signal strength indication (RSSI) circuit to decide whether there is a signal present. If there is no signal, the receiver can be powered-down immediately without waiting for the expiry of a radio channel sampling period. Alternatively, if signal is detected the receiver remains energised and a check is made to see if not only is the signal present but also it is capable of being demodulated. The value of this second check, which is a quality check, is that if the detected signal is due to interference from say an adjacent channel, noise or another signal source, then there is no requirement to decode it and the receiver can be de-energised thus saving power. If the signal can be demodulated then the receiver decodes it.

The signal quality measure can also be used to filter out other signals within a communications system, especially signals on the same carrier but having different data rates.

Figure 2:
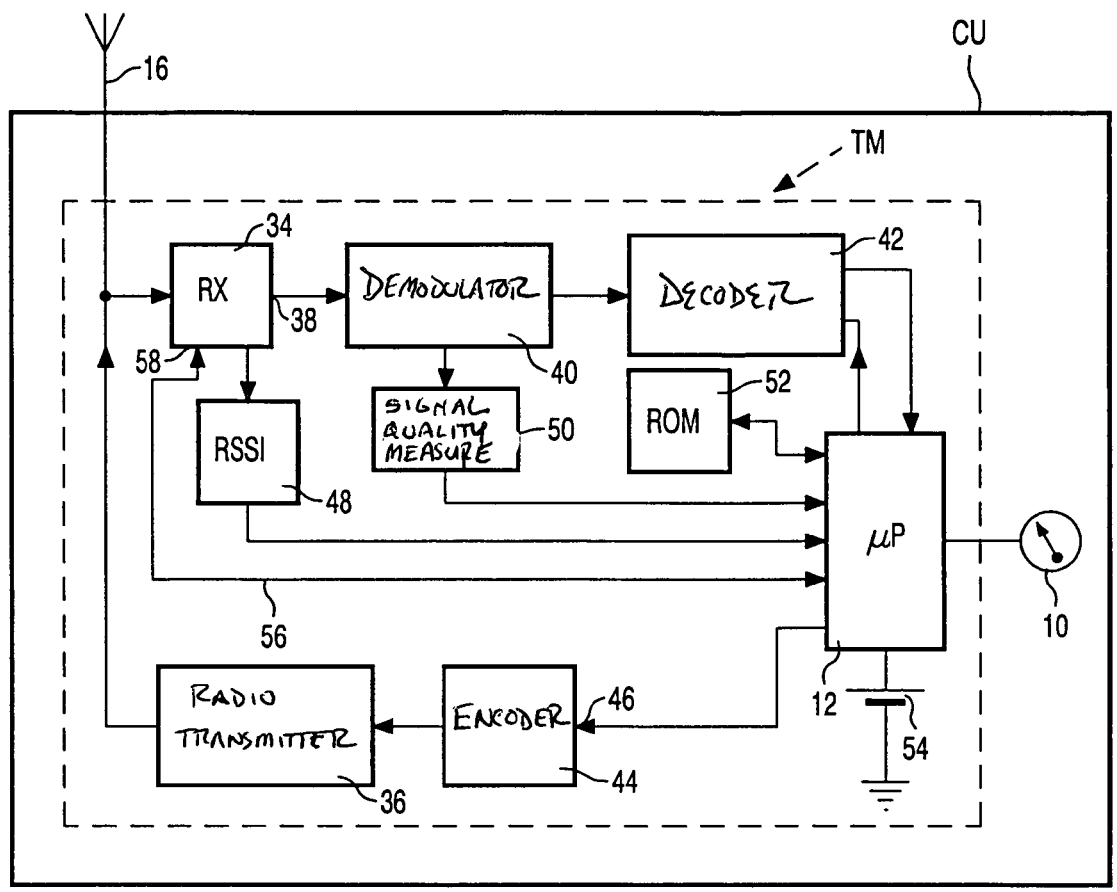
Figure 3:
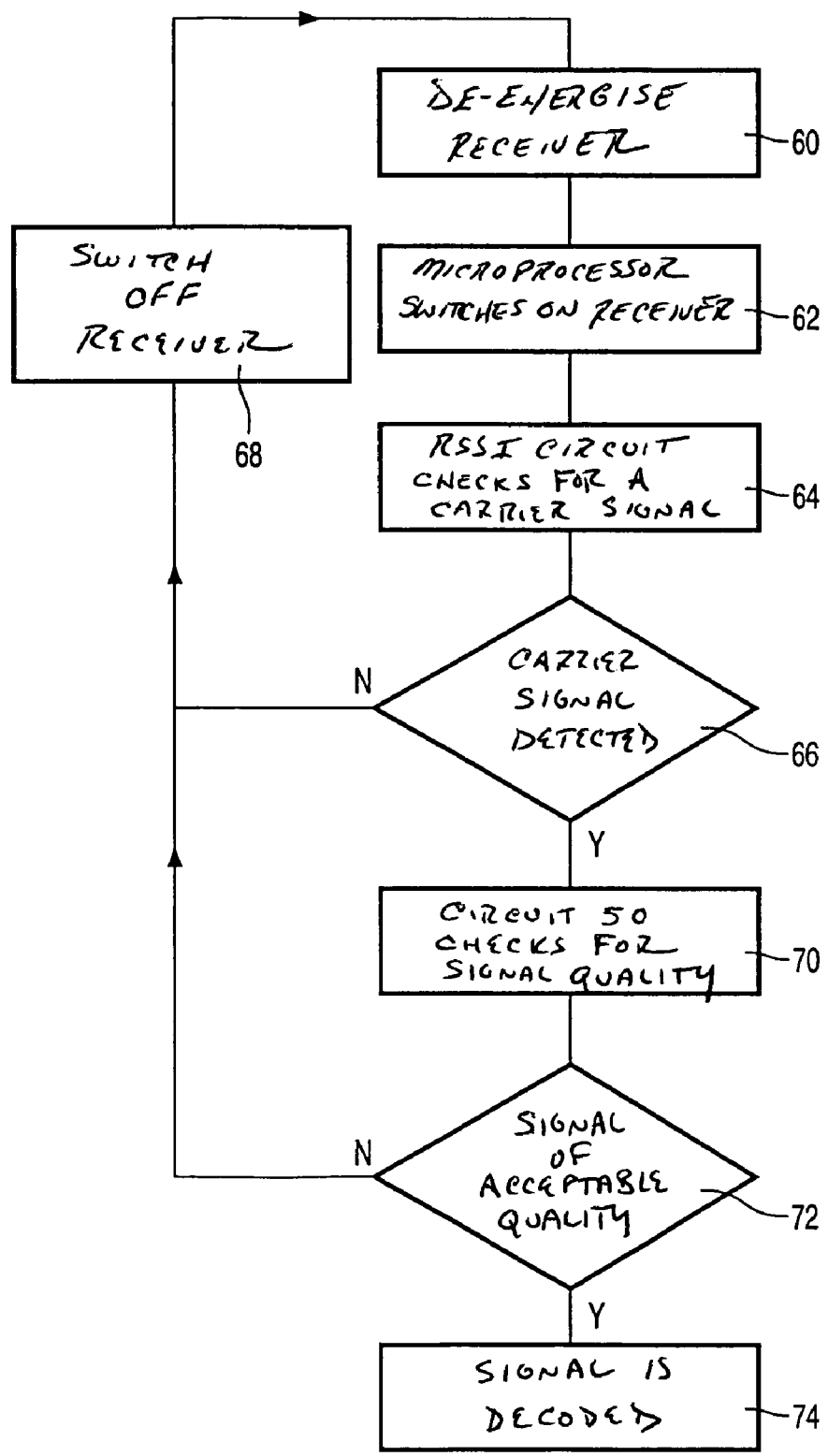

The present invention will now be described, by way of example, with reference to the accompanying drawings, wherein:

FIG. 1 is a diagrammatic view of a simplified embodiment of an automatic water metering system, FIG. 2 is a block schematic diagram of a consumer unit including a telemetry module, FIG. 3 is a flow chart of an implementation of the method in accordance with the present invention, and FIG. 4 is a table showing the different average receiver on times in milliseconds (ms) for examples in which only the RSSI is measured (single stage carrier detection SSCD) and in which the RSSI and single quality are determined (two stage carrier detection TSCD).

In the drawings the same reference numerals have been used to indicate corresponding features.

Referring to FIG. 1, the simplified embodiment of the automatic water metering system comprises a plurality of consumer units CU1, CU2, CU3 attached to water conduits supplying a domestic premises. Each of the consumer units CU1 to CU3 comprises a metering unit 10 operatively coupled to a microprocessor 12 and a transceiver 14 having an antenna 16 which may be incorporated into or comprise a cover for a boundary box set into the ground and containing the consumer unit CU1 to CU3.

The consumer units CU1 to CU3 can be interrogated remotely by in range network interrogation units (NIU) NIU1, NIU2 which relay meter reading information by way of land lines 18, such as the PSTN, or further radio links (not shown) to a management interface unit MIU, which amongst other tasks controls the operation of the metering system and the billing of customers. Additionally the consumer units CU1 to CU3 may be interrogated remotely by portable NIUs (not shown) which store the meter reading information for later transfer to the master interface unit MIU.

In FIG. 1, each of the NIUs, NIU1 and NIU2, covers a respective plurality of meters in a particular geographic area. In order to be able to do this, each of the NIUs is mounted in an elevated position on say a dedicated mast or a lamppost. Each of the NIUs comprises a controller 20 for controlling the operation of a transceiver 22 which may be similar to the transceiver 14 of the consumer unit, the storage of meter information in a store 24 and the relaying of the stored meter information by way of a modem 26.

The master interface unit MIU has a controller comprising a large computer 30 which is coupled to a modem 32 which enables communication to be effected by way of the land lines 18.

The consumer unit CU shown in FIG. 2 comprises a metering unit 10 and a telemetry module TM. The telemetry module TM comprises a radio receiver 34 and a radio transmitter 36 coupled to a common antenna 16. The radio receiver 34 may be of any suitable design, for example zero IF or superheterodyne. An output 38 of the receiver 34 is coupled to a demodulator 40 which in turn is coupled to a decoder 42. The decoder 42 is coupled to the microprocessor 12.

An encoder 44 has an input 46 coupled to the microprocessor 12 and an output coupled to the radio transmitter 36.

A received signal strength indication (RSSI) circuit 48 is coupled to the radio receiver 34 for detecting the presence of a received signal. The circuit 48 has an output coupled to the microprocessor 12.

A signal quality measuring circuit 50 is coupled to the demodulator 40 for determining the quality of the recovered signal. The circuit 50 is coupled to an input of the microprocessor 12.

The microprocessor 12 operates in accordance with program software stored on a ROM 52. A power supply 54 for the telemetry module TM is connected to the microprocessor 12. A power control line 56 couples an output of the microprocessor 12 to a power control input 58 of the receiver 34.

In operation the microprocessor 12 will cause the radio receiver 34 to be energised and de-energised in accordance with the protocol software stored in the ROM 52. However the control of power to the radio receiver 34 can be modified to enhance battery saving by the RSSI circuit 48 monitoring for the presence of a signal whenever the radio receiver is energised in accordance with the protocol being followed. If no carrier signal within the channel is detected, then the microprocessor 12 causes the radio receiver 34 to be de-energised. However if a carrier signal is detected, the signal quality measuring circuit 50 checks the reliability of the demodulated data signals. If the signal quality is acceptable, the microprocessor 12 causes the radio receiver 34 to remain energised, but if the signal quality is unacceptable, it is de-energised.

The signal quality measuring circuit 50 provides a number of beneficial features which are additional to the RSSI circuit 48. The RSSI circuit 48 only detects the carrier for a short time and as a result may have a relatively high false alarm rate while avoiding false dismissals. In contrast the circuit 50 measures the ability to demodulate received data signal rather than just the power present in the channel. This means that the circuit 50 is robust to interfering signals whether noise or the like or modulated (if the interferer is using a different modulation scheme). Additionally the signal quality measure can be used to filter out other signals within the system that are at an unwanted data rate.

FIG. 3 is a flow chart summarizing the operations which have been described. Block 60 denotes the receiver 34 being de-energised. Block 62 denotes the microprocessor 12 switching-on the receiver 34. Block 64 denotes the RSSI circuit 48 checking for a carrier signal. Block 66 denotes checking if carrier signal has been detected. If the answer is no (N) then the flow chart proceeds to block 68 which denotes the receiver 34 being switched-off. Alternatively if the answer is yes (Y), the flow chart proceeds to block 70 which denoted the circuit 50 checking for signal quality. Block 72 denotes checking if the signal is of an acceptable quality. If the answer is no (N), the flow chart reverts to the block 68, but if the answer is yes (Y), the flow chart proceeds to the block 74 which denotes the signal being decoded.

Referring to the table shown in FIG. 4 the rows 80 to 84 are three examples single stage carrier detection (SSCD) in which RSSI alone is measured and row 86 is an example of two stage carrier detection (TSCD) in which both RSSI and signal quality are measured.

The columns represent the following:

| | |
|---|---|
| CDT | Carrier Detect Time in ms |
| CDFR | Carrier Detect False Rate |
| SQT | Signal Quality Time in ms |
| SQFR | Signal Quality False Rate |
| TFT | Total False Rate |
| AROT | Average Receiver On Time in ms. |

The table shows the average length of time that the receiver 34 is powered up when is looks at an empty channel (it is assumed that if a carrier signal is falsely detected then the receiver will need to be powered up for a further 50 ms before the decoder 42 can terminate due to a lack of synchronisation). Comparing the three examples of checking for RSSI only with different length carrier detection times (rows 80, 82, 84) with checking for RSSI and quality in a two stage process (row 86), it will be noted that the two stage process gives the shortest average receiver on time (AROT) and hence the greatest battery saving.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of communication and telemetry systems and components thereof and which may be used instead of or in addition to features already described herein.

The invention claimed is:

1. A battery-powered radio, comprising:
   a receiver circuit, the receiver circuit operable to produce a received signal from a channel;
   a received signal strength indicator circuit coupled to the receiver circuit, the received signal strength indicator circuit operable to produce an output indicating an amount of power in the channel;
   a demodulator circuit coupled to the receiver circuit, the demodulator operable to produce a demodulated signal from the received signal;
   a signal quality indicator coupled to the demodulator circuit;
   a decoder circuit coupled to the demodulator circuit; and
   a microprocessor coupled to the receiver, the received signal strength indicator circuit, the signal quality indicator circuit and the decoder circuit;
   wherein the microprocessor is operable to energize and de-energize the receiver circuit; determine the presence of a carrier with a carrier detect false rate, based, at least in part, on the power of the channel, and to determine an acceptable signal quality with a signal quality false rate, based, at least in part, on an output of the signal quality indicator circuit;
   wherein the microprocessor is operable to energize the receiver circuit for a first period of time, and, if the carrier is determined to be present, to then maintain the receiver in the energized state until a determination is made as to whether acceptable signal quality has been obtained, and to de-energise the receiver substantially immediately without waiting for expiration of any time period if the carrier is determined to be present and the signal quality is not acceptable.

2. The batter-powered radio of claim 1, wherein the microprocessor is operable to de-energize the receiver circuit if the carrier is determined to not be present, without performing a signal quality determination.

3. The battery-powered radio of claim 2, further comprising:
   a metering unit coupled to the microprocessor;
   an encoder circuit coupled to the microprocessor; and
   a radio transmitter circuit coupled to the encoder circuit.

* * * * *